United States Patent [19]
Dressler

[11] Patent Number: 5,866,248
[45] Date of Patent: Feb. 2, 1999

[54] POLYURETHANE FILM FOR HEAT APPLIED GRAPHICS

[75] Inventor: Donald R. Dressler, Glastonbury, Conn.

[73] Assignee: Stahls', Inc., St. Clair Shores, Mich.

[21] Appl. No.: 621,380

[22] Filed: Mar. 21, 1996

[51] Int. Cl.[6] .................................. B32B 3/00; B32B 7/12
[52] U.S. Cl. ........................ 428/343; 428/480; 428/195; 428/200; 428/423.1
[58] Field of Search .................................. 428/195, 200, 428/347, 480, 355, 40.1, 355 R, 343, 423.1

[56] References Cited

U.S. PATENT DOCUMENTS

| | | | |
|---|---|---|---|
| 3,660,212 | 5/1972 | Liebe, Jr. | 161/41 |
| 4,269,885 | 5/1981 | Mahn | 428/216 |
| 4,423,106 | 12/1983 | Mahn | 428/207 |
| 4,786,349 | 11/1988 | Mahn, Sr. | 156/234 |
| 5,312,645 | 5/1994 | Dressler | 427/148 |
| 5,441,785 | 8/1995 | Liebe, Jr. | 428/343 X |
| 5,573,834 | 11/1996 | Stahl | 428/195 |

OTHER PUBLICATIONS

Hytrel Polyester Elastomer (Product and Properties Guide).

*Primary Examiner*—Daniel Zirker
*Attorney, Agent, or Firm*—Alix, Yale & Ristas, LLP

[57] ABSTRACT

A composite film of two layers, comprising a graphic color layer containing at least 50 wt % thermoplastic polyurethane, at least 10 wt % pigment, and a polyester elastomer, and an adhesive layer containing a thermoplastic adhesive. The color layer contains a non-blooming internal wax lubricant constituting less than about 0.1 wt % of the color layer. A combination comprising a laminate of two layers, one layer of which contains a polyurethane and the other layer of which includes an amorphous polyester directly adhered to a fabric, the improvement comprising said layer which contains a polyurethane, having an opaque exposed surface substantially free of surface lubricants. In a process for extruding polyurethane film, the improvement comprising mixing no more than about 0.1 wt % of a non-blooming internal wax lubricant in the polyurethane, prior to extrusion.

18 Claims, 5 Drawing Sheets

POLYURETHANE FILM FOR HEAT APPLIED GRAPHICS

BACKGROUND OF THE INVENTION

The present invention relates to films for use in heat-applied graphics, and more particularly to a urethane film or layer, preferably in a composite having a pigmented polyurethane graphic layer which exhibits a relatively higher melt temperature, and an adhesive layer which exhibits a relatively lower melt temperature.

U.S. Pat. No. 3,660,212 (Liebe) discloses a plastic athletic lettering material and associated method of manufacture, by which a flexible plastic sheet material can be cut to provide pigmented letters, designs, and the like for fusing to fabrics.

A liquid pigmented mass of heat curable plastic, for example plastisol, is knife-spread on a high gloss release sheet and heat cured, to serve as the outer, pigmented side of the sheet material to be formed. An unpigmented pre-formed flexible thermoplastic sheet, having a fusing temperature lower than the temperature of heat curing, is pressed to the newly cured, hot pigmented film, and fused to it. This thermoplastic serves as the inner adherent side of the material. Letters and designs cut from such material may be ironed onto fabric, utilizing heat sufficient to raise the inner, thermoplastic side to fusing temperature without affecting the outer, pigmented side.

Material manufactured in accordance with the technique of the '212 patent, exhibits good opacity, good color stability, and can, with some difficulty using multiple steps, be utilized to make a multi-color graphic, by adhering a first letter of one color, on top of a background of another color. One disadvantage of this is that the material curls during storage prior to use. This material has other disadvantages as well. The thickness is typically on the order of 10 mils, and the plastisol or similar vinyl material becomes embrittled, especially during cold weather and with the passage of time and repeated washing and drying cycles. As a result, the graphic does not have the same flexibility as the fabric, resulting in discomfort for the wearer and a low-quality appearance to the observer.

The technique disclosed in U.S. Pat. No. 4,423,106 (Mahn) overcomes several of the disadvantages of the technique described in the '212 patent. In the '106 patent, a laminated material is formed of a pigmented layer of polyurethane and a layer of amorphous polyester adhesive. The polyester adhesive layer is laminated to the layer of polyurethane under elevated and pressure. The temperature is high enough above the softening point of polyurethane to remove enough toluene solvent from the layer of polyurethane so that curling is prevented when the material is eventually cut into free form graphics and aligned on a preheated fabric. When a graphic of the laminated material is applied to fabric under pressure and heated sufficiently that the layer of polyester becomes adhesive, the laminated material adheres to the fabric.

Thus, the material manufactured in accordance with the '106 patent, provides some improvements relative to the material of the '212 patent, arising from the use of a polyurethane pigmented layer. These include aesthetics in the attached lettering, due in part to less thickness, (e.g., 6.5 mils), greater flexibility, and more tolerant ageing properties. The step of applying the graphics to the garment is also improved, as a result of the absence of curling. In some respects, however, the material of the '106 patent is inferior to that of the '212 patent. The opacity of the pigmented graphic is only fair, and color stability is likewise only fair. Adhesion of one color on top of another color, is relatively poor. Furthermore, the material prior to application on the garment, feels somewhat greasy.

A material made in accordance with the '106 patent is significantly more expensive to manufacture than a material made according to the '212 patent, but for many end uses, the trade off is favorable for obtaining the advantages associated with the polyurethane graphics layer of the '212 patent. Nevertheless, because of this cost differential, it is imperative that the material components used in practicing the techniques of the '106 patent, be as economical as possible. Therefore, urethane film utilized in accordance with the techniques of the '106 patent, has typically been manufactured by the so-called "blown film" process of extrusion.

In any extrusion process, particularly, the blown film type, some degree of lubrication is required to assure that the melted resin can flow along the extrusion dye surface without binding. According to well known techniques for continuous blowing of thermoplastic film, the melted material is subjected to a flow of compressed air, which expands the material in the nature of blowing up a balloon, thereby progressively decreasing the thickness to that of a film. To assure that air does not leak out of the "balloon", the thermoplastic material is confined through a neck or the like, which produces a seal to prevent loss of air pressure. The contact between opposed film surfaces at the neck, must be close enough to achieve the seal, without fusing the film surfaces together.

In the conventional production of polyurethane film, upon reaching the neck, the film has cooled but the material has not fully recrystallized. Therefore, the contact of these relatively soft film surfaces can only be made in the presence of a lubricant which acts as a release agent so the surfaces will not adhere. This lubricant is typically mixed into the polyurethane resin upstream of the blowing station, and is therefore an integral constituent of the melt. Approximately 0.5% of the melt mixture would be a lubricant such as Glycolube VL, an aramid wax, available from Lonza, Inc. This is an internal/external lubricant which has the disadvantage of blooming to the surface of the film.

The poor opacity results when a light color film is applied to a dark garment or when too much time, temperature, or pressure is used in applying the graphic to the fabric substrate. This poor opacity is due in part to a poor color density in the manufactured film based on technical limitations regarding how much pigment loading is possible before process limitations are reached. It is believed that such limits for presently commercialized blown urethane lettering film, are on the order of 11% for $T_iO_2$ in white film. The melt parameters of the presently known urethane products are such that the film softens and flows quite readily into the weave of the fabric when heated for application onto the fabric, thereby causing a loss of opacity and a major encapsulation of the garment fibers. This effectively results in a stiff hand of the applied graphic due to fabric encapsulation.

The presence of a substantial quantity of lubricant in conventional blown film, has been identified by the inventor of the present application, as giving rise to some of the significant disadvantages of heat applied graphic films commercialized based on the teachings of the '106 patent. The difficulty of multi-layer adhesion of one composite graphic film on top of another composite graphic film greatly limits the use of such composites for sport team applications. This deficiency has been known for many years, without a commercially available solution. This adhesion problem can be attributed to a general lack of compatibility between the polyester adhesive and the polyurethane film layer presently being used in practicing the '106 patent. Part of this incompatibility is due to the presence of the surface lubricant, which makes adhesion difficult.

Another problem resulting from surface contamination by the lubricant, limits use of the known composite material in connection with reverse image transfer systems, e.g., on a carrier sheet whereby a computer controlled blade cuts the desired graphics through the composite (urethane and adhesive), but not through the thick carrier. After cutting, the scrap film is peeled away and the graphic remaining in registry on the carrier with adhesive up, is sealed to the garment. After application of the graphic to the garment, the carrier is peeled away.

The surface characteristic of the lubricated film as used in the commercial implementation of the '106 patent, inhibit adhesion to the carrier, so that only large graphics can be cut, but with some difficulty. In particular, as the blade cuts a graphics pattern, the lack of adhesion to the carrier results in shifting of the urethane film during cutting. This prevents the cutting of clean corners, and can prevent completely cutting a corner. These drawbacks severely limit the commercial viability of the material manufactured in accordance with the '106 patent, with a carrier sheet.

SUMMARY OF THE INVENTION

The three deficiencies described above with respect to the urethane type heat applied graphics film in accordance with the '106 patent, have been dramatically improved in accordance with the present invention.

The improvements according to the present invention, have been accomplished by a unique combination of special polymers, not normally considered for use in this type of product, and processed under unique conditions tailored to achieve the desired film properties.

In a process for extruding polyurethane film, the improvement comprises mixing no more than about 0.1 wt % of a non-blooming internal wax lubricant in the urethane, prior to extrusion.

An improved composite film of two layers, comprises a graphic color layer containing at least 50 wt % thermoplastic polyurethane, at least 10 wt % pigment, and a polyester elastomer, and an adhesive layer containing a thermoplastic adhesive.

In an end-use context, the improvement is a combination comprising a laminate of two layers one layer of which contains a polyurethane and a polyester elastomer and one layer of which includes an amorphous polyester, the polyester layer being directly adhered to a fabric, and said laminate prior to being adhered to said fabric being non-curling.

The invention can also be characterized as a non-curling laminate of two films, one of the films containing a thermoplastic polyurethane and the other film containing an amorphous thermoplastic polyester wherein the film containing the thermoplastic polyurethane, also contains a non-blooming internal wax lubricant constituting less than 0.1 wt % of the polyurethane film.

The improvement to opacity results from the pigment loading in the polyurethane graphics layer, reaching at least as high as 18% $T_iO_2$ in white film. Also, the melt parameters result in a film that does not melt and flow into the fabric to any appreciable degree, thereby maintaining the opacity of the applied graphics layer.

Furthermore, multi-layer multi-color adhesion has been enhanced by including a polyester elastomer into the urethane layer, and by dramatically reducing the lubricant at the surface of the polyurethane layer. Each of these contributes significantly to the improved adhesion, and in combination, the improvement is dramatic.

The reduction of lubricant at the film surface, has also extended the options for use of the film, to include adhesion on a carrier sheet. The surface of the film in accordance with the present invention, is virtually dry, and therefore adheres nicely to a pressure sensitive tape or other carrier. This allows one to cut small graphics, i.e., logos down to one quarter inch in type size, and to cut sharp corners, because the film does not move appreciably on the carrier during cutting. Furthermore, because materials for heat applied athletic lettering to be cut on a computer are typically sold in rolls on a 3 inch tube core, at a length between 5 and 50 yards, the lubricated conventional film has difficulty remaining in intimate contact with the carrier after the material has been rolled and shipped. With the present invention, this problem is avoided.

With the present invention, used in the field of heat applied graphics, very good opacity and good color stability are achieved at a thickness of about 6.5 mils. The graphic is flexible, ages well, and can be well adhered in multiple colored layers. The material feels dry and will not curl if care is taken during the manufacturing process. Thus, a product superior to that available under the '106 patent is achieved, at a comparable cost.

In yet another aspect of the invention, curling during end use of the material, is avoided by laminating the polyurethane based graphic layer, to the polyester adhesive layer, then heat stabilizing. The laminate is rolled up with the urethane layer on the outside of the roll, on release paper, with the polyester adhesive layer carried on the paper. The rolled material is placed in a roll oven, preferably for about one hour at 230°–240° F., then cooled at ambient temperature, for about 8–24 hours. Prior to end use, the release paper is removed and the desired free form graphics are cut through the composite sheet of polyurethane and polyester. Even when placed on a pre-heated shirt, the cut graphics will not curl, thereby affording sufficient time for the operator to position the graphics and close the platen against the graphics and shirt, to fuse them together.

According to this aspect of the invention, the original orientation of the urethane film, arising from the blowing or extrusion process, is counteracted. Likewise, the tendency of the urethane to rebound after the stretching due to the tension in the lamination process with the polyester film, is neutralized. The urethane film is thus heat stabilized, toward a state of equilibrium. By rolling the laminated material so that the polyurethane is to the outside, the polyurethane is stretched slightly while the polyester side is compressed slightly. This provides a co-efficient of expansion which is substantially the same as that of the amorphous polyester adhesive, so that even upon heating of free form letters on the platen, there is no net tension to produce undesirable curling.

DESCRIPTION OF THE PREFERRED EMBODIMENT

Figure 1:
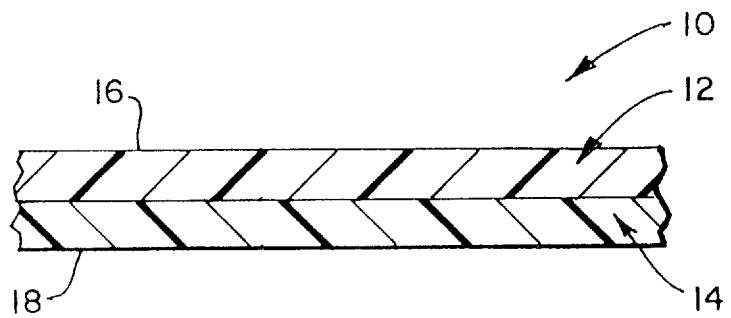
FIG. 1 is a cross-section view of a portion of composite material in accordance with one embodiment of the invention.

FIG. 1 represents in cross-section, a composite film 10 of two layers, comprising a graphic color layer 12 containing at least 50 wt % thermoplastic polyurethane, and a pigment to provide color. The polyurethane layer 12 has been laminated to a second layer 14, containing a thermoplastic adhesive, preferably amorphous polyester, but possibly polyurethane, polyamide, or a combination thereof. Preferably, the graphic color layer 12 has a thickness of about 3–4 mils, and the adhesive layer 14 has a thickness of about 3 mils. Surface 16 is opaquely colored and surface 18 is adapted for adhesion to, e.g., a fabric.

In a manner well known in the field of heat applied graphics, a sheet of the composite material 10 can be die cut by, for example, a steel rule die, water jet, plotter with blade and the like (i.e., in cookie-cutter fashion) to produce a variety of "adhesive down" letters, numerals, symbols, logos, and other decorative indicia. When one or more of the indicia of laminated material is applied to a fabric, for example a sport uniform, under the influence of heat and pressure, the adhesive layer 14 mechanically bonds to the fabric. In particular, the fabric is typically placed on the platen portion of the heat press, with the result that the fabric heats up to some extent. Free form cut letters are placed on the fabric, but it is important that the letters not curl, otherwise accurate positioning becomes virtually impossible. Once the letters are properly aligned, the platen cover is pressed against the platen table, such that a temperature in the range of 330°–365° F. is applied under pressure of, e.g., about 5–10 psi, to soften the polyester so that it encapsulates the fabric. The graphic layer of polyurethane has a higher melt temperature than the adhesive layer, such that, when the heat press is open, the graphic layer provides a smooth, colored indicia.

According to the present invention, an improved composite film 10 provides for greater opacity in the indicia as bonded to the fabric, permits good bonding of one color of composite film 10 to a composite film of a different color, thereby producing a two-color graphic, and finally, the present invention provides greater flexibility for incorporation into "adhesive-up" sheets for computer cutting of reverse images on a carrier sheet, as well as the conventional adhesive down dye cutting of free form lettering.

Figure 2:
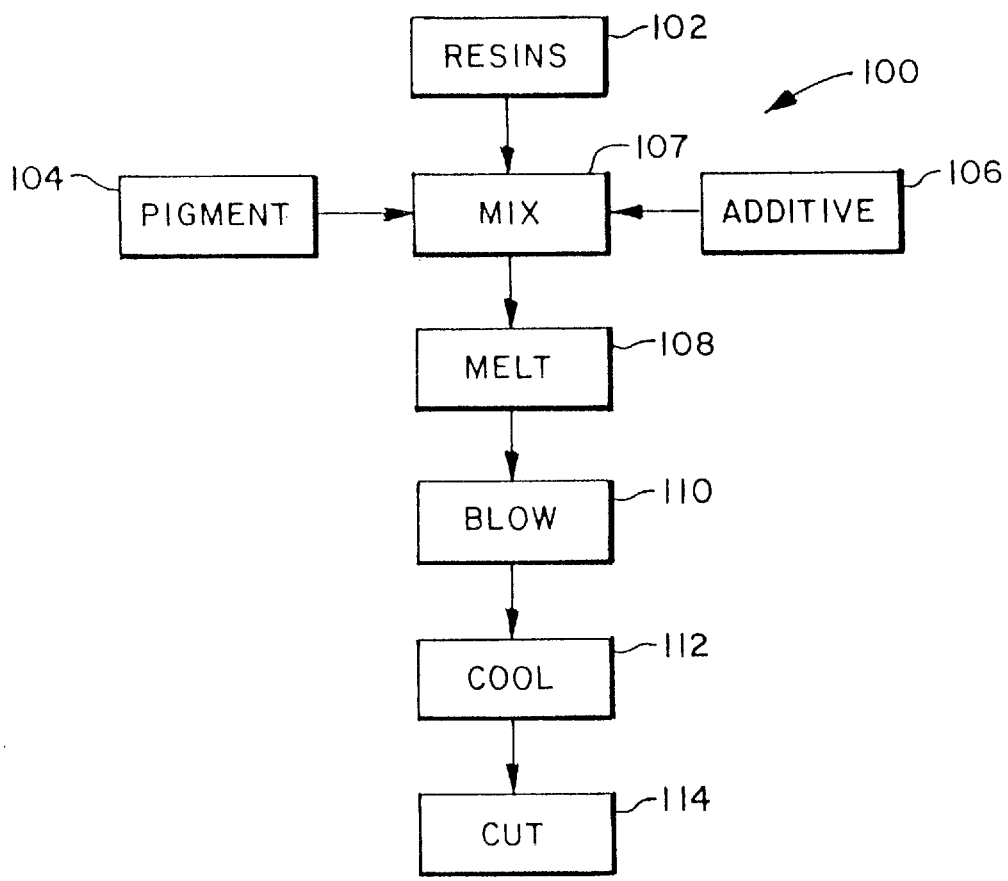
FIG. 2 is a schematic representation of the processing steps for producing one component of the composite shown in FIG. 1.
Figure 3:
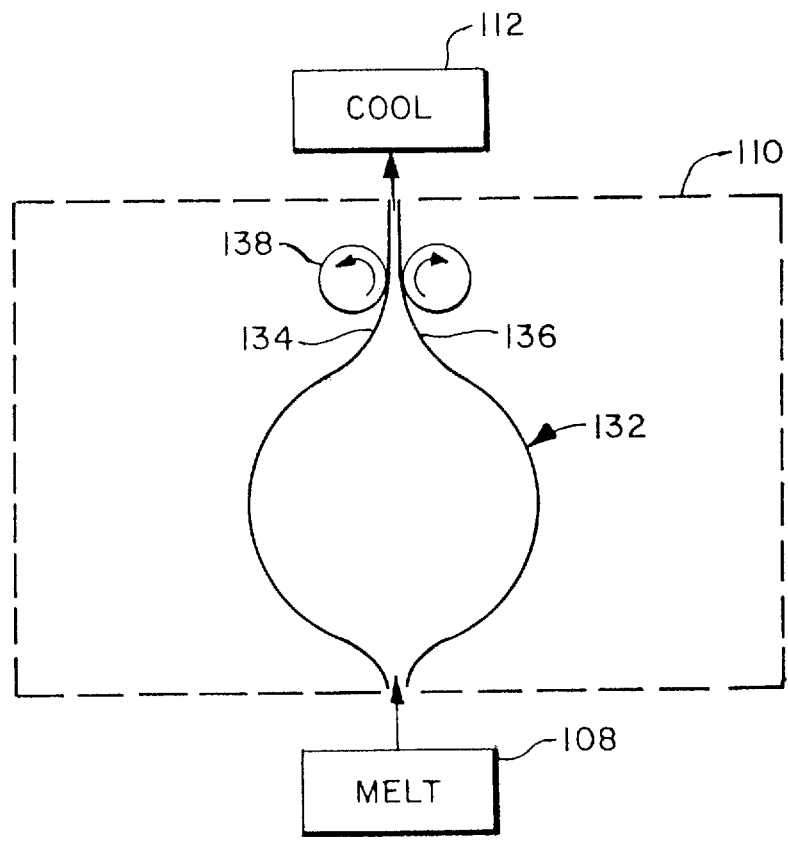
FIG. 3 is a schematic representation of a conventional film blowing process, illustrating additional detail to supplement the schematic of FIG. 2.
Figure 4:
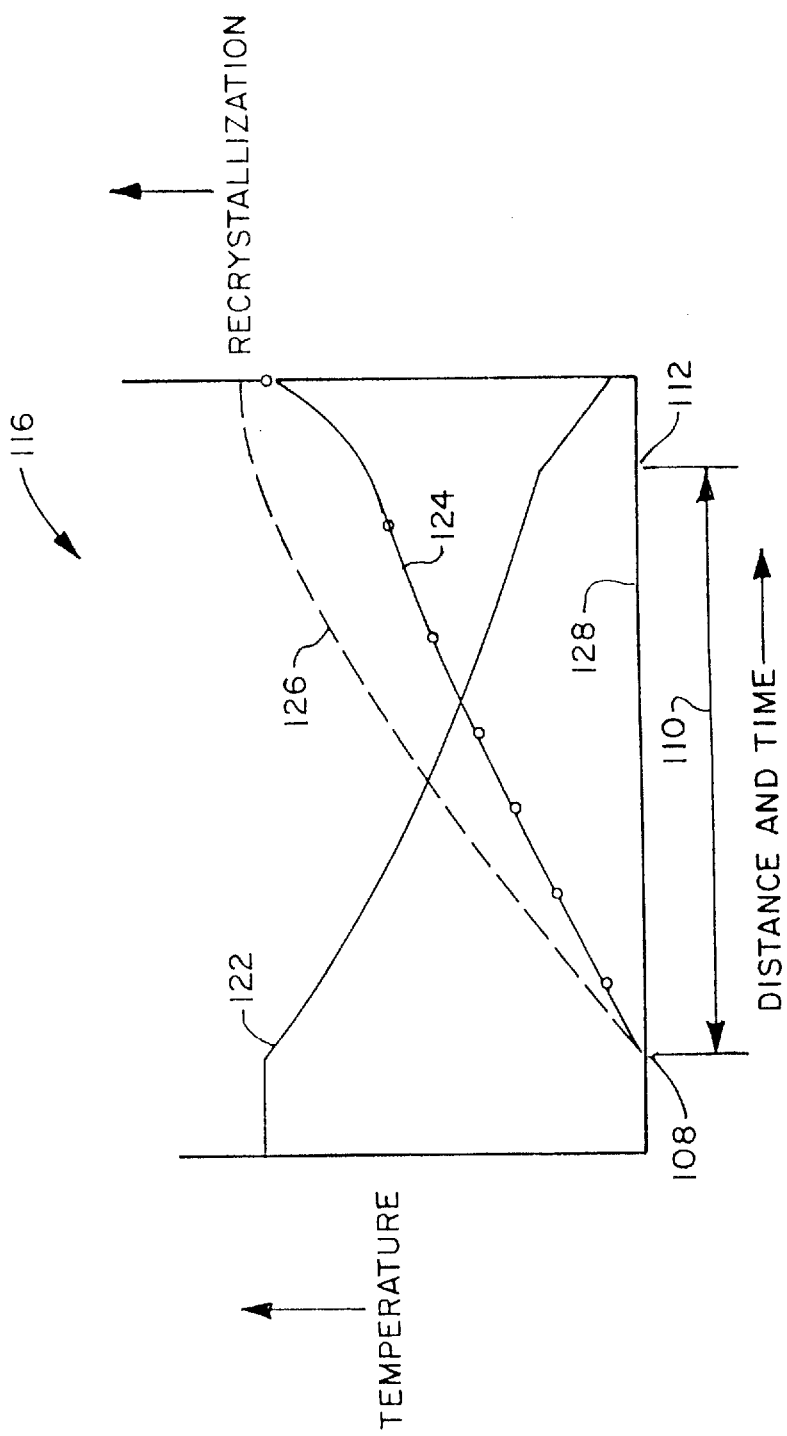
FIG. 4 is a generalized graphic representation of selected process parameters associated with the process of FIG. 2, showing the difference in recrystallization rate for conventional urethane film as compared with the process according to the present invention.

These improvements arise from a novel combination of constituents for the production of the pigmented urethane graphics layer 12. FIGS. 2–4 presents schematically, the preferred manner by which the pigmented polyurethane graphics layer 12, is manufactured. This process is shown generally at 100, and includes the initial steps of selecting one or more polyurethane resins 102, the pigments 104 to provide the desired color, and processing additives 106 that may be necessary for facilitating the subsequent processing steps. These constituents are mixed together at 107 prior to melting at 108, but it should be appreciated that steps 107 and 108 can in some instances be combined, e.g., the additive 106 could be supplied to the melt 108 directly. The melt is subjected to the introduction of compressed air, at step 110, whereupon the melt material forms a balloon-like structure 132 having discernable opposed surfaces 134,136. As a result of this ballooning effect, the material stretches into a thin film of the desired thickness. The maintenance of the balloon, however, requires that the opposed surfaces 134,136 be "pinched" between nip rollers at 138. This pinching prevents excess leakage of air from the blowing process, and therefore maintains the ability for the material to expand and stretch to the desired thickness. After the pinching point at 138, the film is cooled at 112 and cut at 114.

FIG. 4 represents the time period from the exit of the melt step 108 to the beginning of the cooling step 112. During this time, the temperature 122 of the material decreases and, as a result, there is an associated recrystallization curve 124 of the melted material. Conventionally, however, in the blowing of polyurethane films, the recrystallization rate is relatively slow, such that at the time 128 when the material passes through the pinch point 138, the surfaces 134 and 136 would, under the influence of the pinching rollers, bind to each other and prevent the subsequent cutting into distinct film layers. For this reason, one of the additives at 106, is typically a lubricant such as Glycolube VL, which constitutes about 0.5 wt % of the melt 108.

This lubricant remains distributed throughout the polyurethane material during the cooling and cutting 112,114. Overtime, the lubricant tends to bloom to the surface, as a contaminant relative to the purposes for which the urethane is used in the present invention. Moreover, the presence of the lubricant tends to lower the recrystallization rate 124.

In one aspect of the present invention, the resin constituents 102 are selected for an improved combination of recrystallization rate while maintaining the desired performance, including melt temperature, when ultimately laminated into the composite material shown in FIG. 1. According to the invention, the urethane material has a sufficiently high rate of recrystallization, such that the conventional blowing process depicted in FIGS. 2 and 3, can be operated satisfactorily with less than about 0.1 wt % of lubricant added at 106. The lubricant is preferably a non-blooming internal wax lubricant, such as Acrawax C, available from Lonza Inc. of Fairlawn, N.J. Preferably, the lubricant content is less than 0.05 wt %, especially about 0.04 wt %, of the melt 108. The mixture 107 according to the present invention, contains up to about 90% polyurethane resin and at least about 10% pigment.

The much lower lubricant content, takes full advantage of the higher recrystallization rate, which is illustrated at curve 126 in FIG. 4. It can be appreciated that there is a substantial difference in the extent of crystallization at the point in time 128 when pinching occurs, for a given melt cooling curve 122. The higher crystalinity of surfaces 134 and 136 at the pinch point 138, requires less lubricant to prevent binding.

Figure 5:
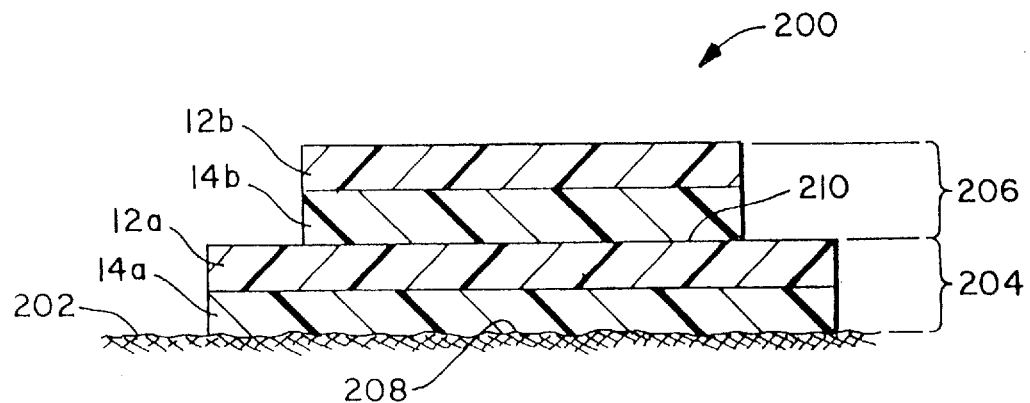
FIG. 5 is a cross section view of the composite material of FIG. 1, adhered to a fabric and to another piece of composite material, to form a two-color graphic.

The resulting pigmented urethane, when laminated with the adhesive layer as shown in FIG. 1, has superior properties because the exposed graphic layer surface 16 is not contaminated with lubricants. As a minimum, this advantage facilitates the adhesion of one composite film, onto another composite film, as depicted in FIG. 5. FIG. 5 shows the result of an applied graphic 200, to a fabric 202, wherein a free form number shown in cross section at 204 having a first color, is adhered at 208 directly to the fabric, whereas a second free form number 206 having a different color, is adhered to the first free form number 204, along surface 210. It can be appreciated that in the first number 204, adhesive layer 14a is bonded to the fabric 202, and graphic layer 12a of polyurethane remains laminated to the layer 14a. As a result of the heat and pressure from the platen, the adhesive layer 14b of the second number 206, is adhered along surface 210 to the polyurethane layer 12a, whereas the graphic layer 12b, remains laminated to the adhesive layer 14b. It is noted that whereas the adhesive layer 14a, such as amorphous polyester, is adhered to fabric 202 as a result of the mechanical bonding and encapsulation due to the melting, the adhesive layer 14b secures the second number 206 to the polyurethane layer 12a.

With the conventionally manufactured urethane layers 12a,12b, the lubricant blooms to the surface and contaminates the adhesive effect between the polyester in layer 14b and the polyurethane in layer 12a. With the improvement according to the invention as described immediately above, this contamination is reduced considerably, e.g., by a factor of at least ten, thereby significantly improving the bond at 210 when the composite of FIG. 1 is used in a two color application.

The adhesion at the interface 210 as shown in FIG. 5, can be further improved by including an additional novel aspect of the present invention. According to this further improvement, the pigmented polyurethane layer 12 (in FIG. 1) and 12a, 12b (in FIG. 5), also includes a polyester elastomer. The polyester elastomer can be one containing hard segments derived from a low molecular weight diol and soft segments derived from a polyoxyalkylene diol. For example, a terephthalate polyester elastomer may be prepared by the condensation of terephthalic acid and a diol mixture containing 1,4-butanediol and a long chain polyoxypropylene glycol or polytetramethylene ether glycol. The long chain polyether may advantageously have a number average molecular weight between about 500 Da (Daltons) and 4000 Da. Other diacids or diacid derivatives which product crystalline hard segments are also useful, as are numerous hard segment diols such as ethylene glycol, propylene glycol, 1,2- and 2,3-butylene glycol, neopentyl glycol, 1,4-cyclohexanediol, and cyclohexanedimethanol. Other soft segment polyethers are also useful, for example, polyethylene glycols, polybutylene glycols, and copolymer polyether glycols containing two or more oxyalkylene moieties derived from ethylene oxide, propylene oxide, oxetane, 1,2- and 2,3-butylene oxide, and tetrahydrofuran. The elastomer is preferably a block co-polymer comprising a crystalline segment of polybutylene teraphalate and an amorphous segment based on long-chain polyether glycols. An especially effective material, is available from the DuPont Company, as Hytrel 4056.

With reference to FIG. 2, the constituents of the mix 107 according to this further improvement, would include 60–75 wt % polyurethane resin, and 10–20% of the polyester elastomer resin supplied at 102, along with the lubricant at less than 0.1 wt % supplied at 106. The pigment supplied at 104 would be at least 10 wt %. The polyester elastomer polyurethane, pigment, and lubricant would thus appear uniformly distributed in the pigmented polyurethane layers 12,12a,12b.

The polyester elastomer in the urethane layer, acts as an adhesion promoter, providing a synergistic effect with the polyester in the adhesive layer at the interface 210 shown in FIG. 5. Furthermore, the Hytrel material has substantially the same desirable properties for athletic lettering purposes, as the urethane, thereby avoiding deleterious incompatibilities.

In a still further preferred novelty of the present invention, the urethane provided from 102 to the mixture 107 as shown in FIG. 2, consists of two different resins. A relatively high melting point urethane resin, such as Deerfield No. 7108 available from the Deerfield Urethane Division of Miles, Inc. has a melting point in the range of 350°–375° F.. This is mixed with a lower melt point urethane resin, such as Deerfield No. 7111, which is believed to have a melt point in the range of 345°–365° F. The resulting color layer has a melt temperature in the range of about 330°–355° F., whereas the adhesive layer would typically have a melt temperature of about 250°–275° F., i.e., at least about 50° F. lower. In combination, the resins have a rate of recrystallization that is higher than, e.g., Deerfield Urethane resin No. PS-8010, which has been conventionally used for blowing pigmented urethane lettering film. (Resin PS-8010 is a pigmented version of B. F. Goodrich Estane 58277 polyurethane.) The weight percent ratio of the high melt to the low melt urethane, is preferably about 2.5 to 1.

A further advantage of utilizing these new constituents, is that a higher pigment loading capability has been observed, e.g., 18 wt % of the mixture 107, and this may perhaps reach as high as 20%. The particular selection of resins of the preferred embodiment, has a relatively high melt strength, such that up to about 20% of the melt can contain pigment while maintaining the integrity of the melt as it is blown. In the conventional blowing of urethane lettering film, the blowing process is degraded unacceptably, beyond a pigment content above about 11%.

Thus, with all aspects of the preferred embodiment combined into a single highly preferred urethane film, the mixture 107 comprises 60–75 wt % polyurethane, 10–20 wt % polyester elastomer, 15–20 wt % pigment, and less than 0.1 wt % non-blooming internal wax lubricant. In a particularly effective embodiment, the mixture 107 contains about 18% pigment, about 12% polyester elastomer, about 49% of the high melt Deerfield No. 7108 polyurethane, about 19% of the low melt Deerfield No. 7111 polyurethane, and about 0.04 wt % lubricant.

Practitioners in this field will recognize that the percentages of the constituents in the urethane film 12 of FIG. 1, will clearly follow the constituent percentages in the melt 108 of FIG. 2.

It should be appreciated that the various resins indicated at 102 may contain trace amounts of lubricant associated with the prior processing of the resins into pellets or the like. Clearly, these residual lubricants are not sufficient to provide the required lubricating effect at the pinch point 138 of FIG. 3. According to the present invention, additional lubrication is deliberately added at 106 as part of the mixing of the ingredients at 107 or 108, to achieve the necessary lubricating effect at the pinch point 138.

The particular combination of the two urethane resins of the preferred embodiment, achieves the desirable characteristic that, although the urethane layer 12 remains substantially intact when the adhesive layer 14 bonds to the fabric, thereby avoiding a degradation of opacity, the urethane layer softens to a sufficient degree, as to take on the texture of the platen or a texturing pad or embossing sheet that may be interposed between the platen and the graphic layer 12. Although the platen temperature is typically in the range of 330°–350° F., this temperature is typically applied for only a few seconds (e.g., 3–8 seconds) through the texturing pad, which acts as an insulator. Sufficient heat is transferred to melt the adhesive layer 14, but only soften the urethane layer 12, so that the surface 16 of the urethane layer 12 assumes a texture corresponding to the pad.

Figure 6:
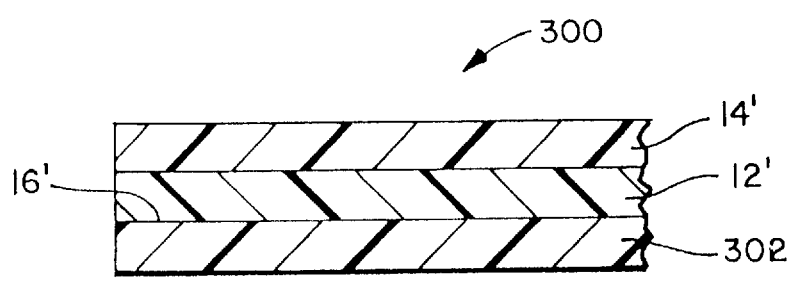
FIG. 6 is a cross section view of the composite material of FIG. 1, as part of a three component material including a release carrier sheet.

FIG. 6 shows another aspect of the present invention, wherein a lettering material 300 has three layers. In effect, the two layer material shown in FIG. 1, is carried by a release carrier sheet 302, such that the urethane graphic layer 12' is in intimate contact with the carrier sheet 302 and the adhesive layer 14' is "up". This embodiment, is specially adapted for the computer cutting of complex graphic patterns through the adhesive and colored layers 14',12'. The unwanted portions are peeled away, leaving a reverse image of the desired graphic pattern, on the carrier sheet 302. The graphic pattern is then placed with the adhesive layer 14' on the fabric, and the platen cover is pressed against the carrier sheet 302 until the adhesive layer 14' bonds to the fabric.

A three layer composite 300 of the type shown in FIG. 6 has limited commercial potential if the conventional composite is used, due at least in part to the lubrication contamination of the surface 16' on the urethane layer 12'. This would not bond well with the carrier sheet 302, such that clean cuts necessary to form complex patterns, could not be performed. This limits the size of the graphics that can be cut. With applicant's invention, wherein the lubricant in the urethane layer 12' is minimized and therefore the surface 16' is dry, the adhesive up type, three layer composite 300 of the type shown in FIG. 6 is improved due to increased adhesion. This allows more intricate graphics to be cut. Also, the composite 300 stays together better while stored in a roll.

Figure 7:
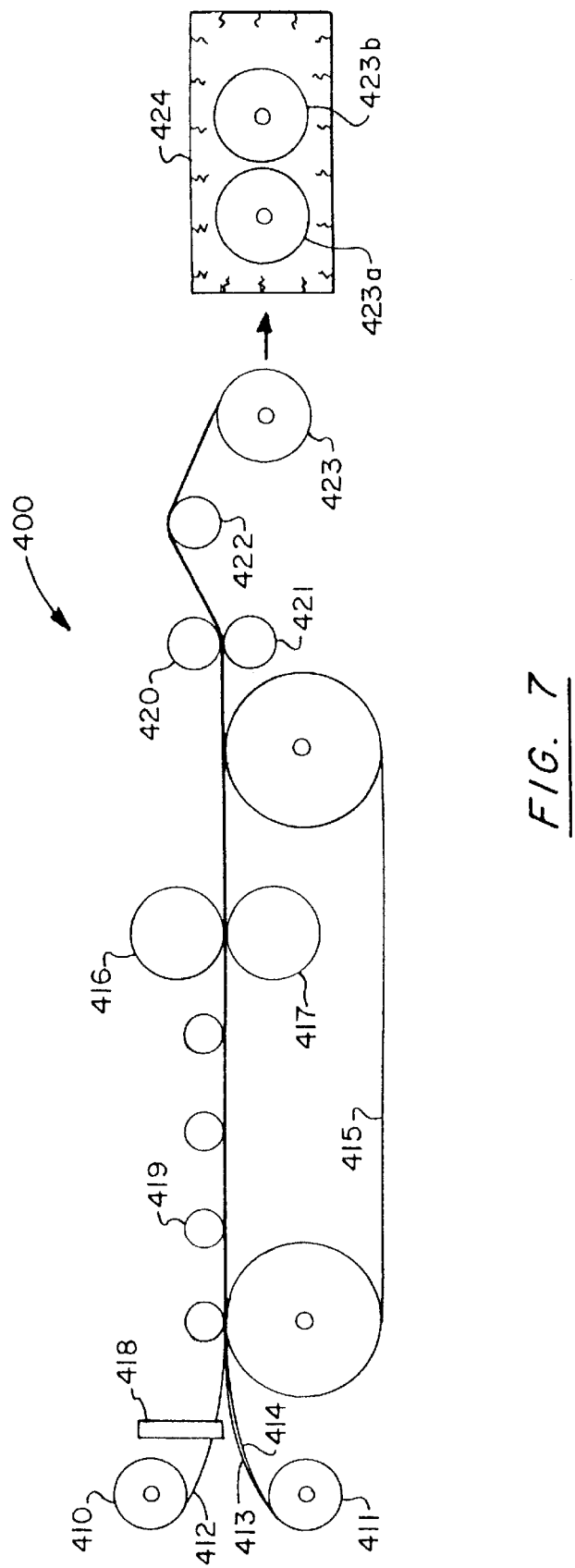
FIG. 7 is a schematic representation of the preferred technique for stabilizing the composite material shown in FIG. 1 to avoid curling during end use as athletic lettering material.

FIG. 7 illustrates yet another improvement associated with the present invention, wherein a technique 400 materially different from that disclosed in U.S. Pat. No. 4,423,106, is effective to prevent curling of free form letters made from the composite material, when placed on a garment warmed in a press machine, prior to the application of sustained heat and pressure. The process differs from that of the '106 patent, in that toluene solvent is not present in, nor need be driven off by heat from, the layer 412 of polyurethane to prevent curling. Instead, the rolled composite material 423 is heat-stabilized in a batch process in oven 424, after removal from the lamination line.

In particular, a roll 411 of amorphous polyester film 413 carried on a silicone-coated paper or similar release sheet 414, is advanced in parallel with a film 412 of the polyurethane from roller 410. A guide member 418 may be utilized to orient the film 412 relative to the material from roller 411, so that they are in intimate contact as they are advanced together under guide rolls 419 along an endless belt 415 for introduction between the laminating rollers 416 and 417. The rollers 416,417 exert a pressure of, for example, 40 psi on the layers 412 and 413 at, for example, a temperature high enough to raise the temperature of the layer 412 of polyurethane, above the softening point.

After the bonded layers 412 and 413 have passed between the heated rollers 416 and 417, they are a laminated composite which is advanced by rollers 420 and 421. These rollers are driven at such a speed as to minimize the tension exerted on the material. The material is then wound around roll 423. Although a chill roll 422 may optionally be situated between the rollers 420,421 and the take up roller 423, this is not normally necessary, because it is preferred that the material be wound on roll 423 while the material is still warm.

The material is wound on roll 423 with the urethane layer 412 to the outside, and the release paper 414 to the inside. Once the capacity of the roll 423 has been reached, the roll may by itself, or with a plurality of similar other rolls 423a,423b, be placed in a heat treating oven 424 for approximately one hour or more at 230°–240° F., i.e., slightly below the melt point of the adhesive. Alternatively, the laminate can be heated sufficiently after the nip rolls 416 and 417, so that the residual heat in roll 423 is sufficient to maintain the stabilization temperature for about one hour. The rolls are thereafter cooled at ambient conditions, for a period of 8–24 hours. After the ambient cooling, the rolls can be shipped or the material on the rolls can be cut into smaller units, for shipment to the end user. The release paper can be removed at any handling point after the completion of the ambient cooling step. Because of the heat stabilization effect, free form graphics cut from the composite consisting of the layer 412 laminated to the layer 414, i.e., the composite as shown in FIG. 1, will not curl even when placed on a warm fabric.

The inventor believes that the combination of rolling the material at roller 423 with the polyurethane layer 412 to the outside, coupled with the heat treatment step in a batch process while the laminated material is still on roll 423, overcomes the residual tension effects which give rise to the curling problem. This residual tension is due to the polyurethane film 412 having an inherent orientation resulting from the blowing or extrusion process by which it was manufactured, whereas the polyester layer 413 is amorphous. After lamination and when subjected to increased temperature by the end user, a differential expansion/contraction effect causes curling. According to the invention, the rolling of the laminate material at 423, tends to stretch the polyurethane layer 412 on the outside, while compressing the polyester layer 413 on the inside. The heat stabilization while the polyurethane layer 412 is in tension and the polyester layer 413 is in compression on roll 423, alters the properties such that the resulting composite as shown in FIG. 1, exhibits little or no differential expansion effect in the free form lettering.

I claim:

1. A composite film of two layers, comprising:
    a graphic color layer containing at least 50 wt % thermoplastic polyurethane, at least 10 wt % pigment, and a polyester elastomer; and
    an adhesive layer containing a thermoplastic adhesive.

2. The film of claim 1, wherein the color layer comprises at least 60 wt % polyurethane and said polyurethane, pigment, and polyester elastomer are distributed uniformly throughout said color layer.

3. The film of claim 1, wherein the polyester elastomer is a block co-polymer comprising a crystalline segment of polybutylene terethalate and an amorphous segment based on long-chain polyether glycols.

4. The film of claim 1, wherein the polyester elastomer contains hard segments derived from a low molecular weight diol and soft segments derived from a polyoxyalkylene diol.

5. The film of claim 1, wherein said color layer contains up to about 70 wt % polyurethane having a higher rate of re-crystallization than the polyurethane sold by Deerfield Urethane as Deerfield No. 8010.

6. The film of claim 1, wherein the color layer contains between 15–20 wt % pigment.

7. The film of claim 1, wherein the color layer has a melt temperature at least about 50° F. higher than the melt temperature of the adhesive layer.

8. The film of claim 1, wherein the adhesive layer comprises one of a group of materials consisting of an amorphous polyester, polyurethane, polyamide, or a combination thereof.

9. The film of claim 1, wherein the color layer contains a non-blooming internal wax lubricant constituting less than about 0.1 wt % of the color layer.

10. The film of claim 5, wherein the color layer comprises 60–75 wt % polyurethane, and 10–20 wt % polyester elastomer.

11. The film of claim 10, wherein the color layer contains between 15–20 wt % pigment.

12. The film of claim 5, wherein the color layer contains a non-blooming internal wax lubricant constituting less than about 0.1 wt % of the color layer.

13. The film of claim 1, wherein the adhesive layer is amorphous polyester.

14. A composite film of two layers, comprising:

a graphic color layer containing at least about 60 wt % thermoplastic urethane, a polyester elastomer, and at least about 15% pigment; and an adhesive layer containing a thermoplastic adhesive having a melt temperature at least about 50° F. lower than the melt temperature of the color layer.

15. The film of claim 14, wherein said thermoplastic urethane comprises a mixture of a first polyurethane material having a melt temperature in the range of about 350° F.–375° F. and a second polyurethane material having a melt temperature in the range of about 345° F.–365° F., and wherein said color layer has a melt temperature in the range of about 330° F.–355° F.

16. The film of claim 15, wherein the weight per cent ratio of said first polyurethane material to said second polyurethane material, is about 2.5:1.

17. A combination comprising a laminate of two layers, one layer of which contains a polyurethane and the other layer of which includes an amorphous polyester directly adhered to a fabric, the improvement comprising said layer which contains a polyurethane, having a substantially uniform distribution of polyester elastomer and an opaque exposed surface substantially free of surface lubricants.

18. A laminate of two films, at least one of the films containing a thermoplastic polyurethane and one film containing a thermoplastic polyester, said thermoplastic polyester being amorphous, and wherein said laminate is non-curling, the improvement comprising said film containing a thermoplastic polyurethane, also containing a substantially uniform distribution of polyester elastomer and a substantially uniform distribution of a non-blooming internal wax lubricant constituting less than 0.1 wt % of the weight of said film.

\* \* \* \* \*